(12) United States Patent
Downey

(10) Patent No.: US 6,265,787 B1
(45) Date of Patent: Jul. 24, 2001

(54) VEHICLE ANTI-THEFT SYSTEM

(76) Inventor: Richard T. Downey, 12364 53rd Avenue, Surrey, B.C. (CA), V3X 3B7

(*) Notice: Subject to any disclaimer, the term of this patent is extended or adjusted under 35 U.S.C. 154(b) by 0 days.

(21) Appl. No.: 09/238,599

(22) Filed: Jan. 28, 1999

(51) Int. Cl.[7] ........................... G08C 19/00
(52) U.S. Cl. .................. 307/10.2; 307/10.3; 180/287; 340/825.72
(58) Field of Search .................. 307/10.2, 10.3, 307/10.6; 180/287; 340/825.72, 426; 123/335

(56) References Cited

U.S. PATENT DOCUMENTS

| | | | |
|---|---|---|---|
| 4,413,261 | * 11/1983 | Greenberg | 307/10.3 |
| 4,660,528 | * 4/1987 | Buck | 123/335 |
| 5,604,384 | * 2/1997 | Carlo et al. | 307/10.2 |
| 5,623,245 | * 4/1997 | Gilmore | 307/10.2 |
| 5,811,886 | * 9/1998 | Majmudar | 307/10.2 |

* cited by examiner

Primary Examiner—Albert W. Paladini

(57) ABSTRACT

A vehicle anti-theft system for permitting a user to electively disable an ignition coil of a vehicle so that the vehicle cannot be started unless reactivated by the user. The vehicle anti-theft system includes a distributor, an ignition coil electrically connected to the distributor, and a battery electrically connected to the ignition coil to provide electrical energy to the ignition coil. A cutoff switch is electrically connected between the battery and the ignition coil to selectively provide electrical power to the ignition coil. A remote controller has a transmitter for transmitting a signal. The cutoff switch has a receiver for receiving the signal from the remote controller. The cutoff switch precludes the supply of energy to the ignition coil from the battery upon receipt of a first signal from the remote controller. The cutoff switch allows the supply of energy to the ignition coil from the battery upon receipt of a second signal from the remote controller subsequent to receipt of the first signal.

1 Claim, 1 Drawing Sheet

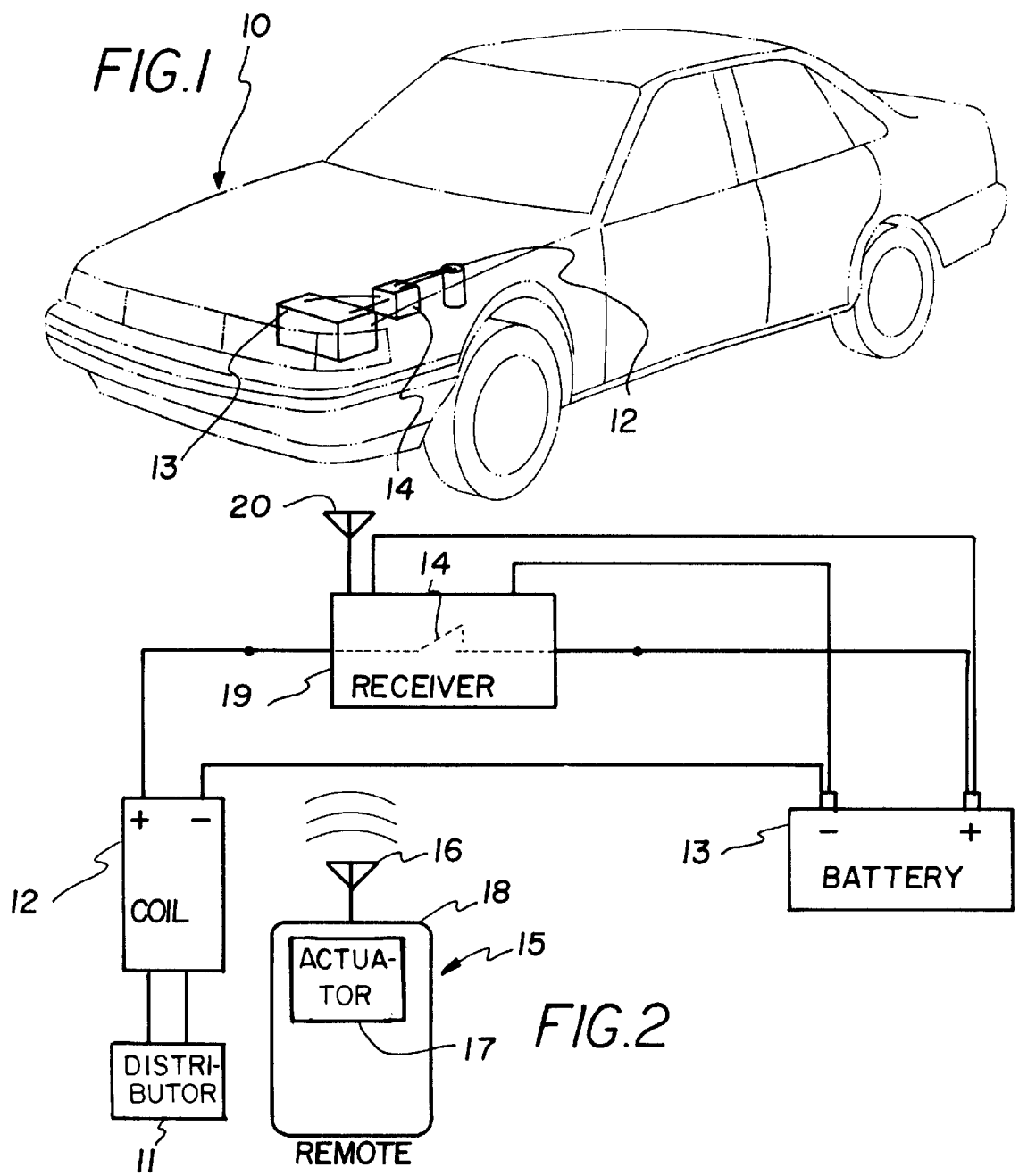

VEHICLE ANTI-THEFT SYSTEM

BACKGROUND OF THE INVENTION

1. Field of the Invention

The present invention relates to anti-theft systems for vehicles and more particularly pertains to a new vehicle anti-theft system for permitting a user to selectively disable an ignition coil of a vehicle so that the vehicle cannot be started unless reactivated by the user.

2. Description of the Prior Art

The use of anti-theft systems for vehicles is known in the prior art. More specifically, anti-theft systems for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,224,567 by Tomlinson; U.S. Pat. No. 4,928,778 by Tin; U.S. Pat. No. 5,307,048 by Sonders; U.S. Pat. No. 4,992,670 by Pastor; U.S. Pat. No. 5,477,090 by Davis; and U.S. Pat. No. 5,503,059 by Pacholok.

While these devices fulfill their respective, particular objectives and requirements, the aforementioned patents do not disclose a new vehicle anti-theft system. The inventive device includes a distributor, an ignition coil electrically connected to the distributor, and a battery electrically connected to the ignition coil to provide electrical energy to the ignition coil. A cutoff switch is electrically connected between the battery and the ignition coil to selectively provide electrical power to the ignition coil. A remote controller has a transmitter for transmitting a signal. The cutoff switch has a receiver for receiving the signal from the remote controller. The cutoff switch precludes the supply of energy to the ignition coil from the battery upon receipt of a first signal from the remote controller. The cutoff switch allows the supply of energy to the ignition coil from the battery upon receipt of a second signal from the remote controller subsequent to receipt of the first signal.

In these respects, the vehicle anti-theft system according to the present invention substantially departs from the conventional concepts and designs of the prior art, and in so doing provides an apparatus primarily developed for the purpose of permitting a user to selectively disable an ignition coil of a vehicle so that the vehicle cannot be started unless reactivated by the user.

SUMMARY OF THE INVENTION

In view of the foregoing disadvantages inherent in the known types of anti-theft systems for vehicles now present in the prior art, the present invention provides a new vehicle anti-theft system construction wherein the same can be utilized for permitting a user to selectively disable an ignition coil of a vehicle so that the vehicle cannot be started unless reactivated by the user.

The general purpose of the present invention, which will be described subsequently in greater detail, is to provide a new vehicle anti-theft system apparatus and method which has many of the advantages of the anti-theft systems for vehicles mentioned heretofore and many novel features that result in a new vehicle anti-theft system which is not anticipated, rendered obvious, suggested, or even implied by any of the prior art anti-theft systems for vehicles, either alone or in any combination thereof.

To attain this, the present invention generally comprises a distributor, an ignition coil electrically connected to the distributor, and a battery electrically connected to the ignition coil to provide electrical energy to the ignition coil. A cutoff switch is electrically connected between the battery and the ignition coil to selectively provide electrical power to the ignition coil. A remote controller has a transmitter for transmitting a signal. The cutoff switch has a receiver for receiving the signal from the remote controller. The cutoff switch precludes the supply of energy to the ignition coil from the battery upon receipt of a first signal from the remote controller. The cutoff switch allows the supply of energy to the ignition coil from the battery upon receipt of a second signal from the remote controller subsequent to receipt of the first signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle anti-theft system apparatus and method which has many of the advantages of the anti-theft systems for vehicles mentioned heretofore and many novel features that result in a new vehicle anti-theft system which is not anticipated, rendered obvious, suggested, or even implied by any of the prior art anti-theft systems for vehicles, either alone or in any combination thereof.

It is another object of the present invention to provide a new vehicle anti-theft system which may be easily and efficiently manufactured and marketed.

It is a further object of the present invention to provide a new vehicle anti-theft system which is of a durable and reliable construction.

An even further object of the present invention is to provide a new vehicle anti-theft system which is susceptible of a low cost of manufacture with regard to both materials and labor, and which accordingly is then susceptible of low prices of sale to the consuming public, thereby making such vehicle anti-theft system economically available to the buying public.

Still yet another object of the present invention is to provide a new vehicle anti-theft system which provides in the apparatuses and methods of the prior art some of the advantages thereof, while simultaneously overcoming some of the disadvantages normally associated therewith.

Still another object of the present invention is to provide a new vehicle anti-theft system for permitting a user to selectively disable an ignition coil of a vehicle so that the vehicle cannot be started unless reactivated by the user.

Yet another object of the present invention is to provide a new vehicle anti-theft system which includes a distributor, an ignition coil electrically connected to the distributor, and a battery electrically connected to the ignition coil to provide electrical energy to the ignition coil. A cutoff switch is electrically connected between the battery and the ignition coil to selectively provide electrical power to the ignition coil. A remote controller has a transmitter for transmitting a signal. The cutoff switch has a receiver for receiving the signal from the remote controller. The cutoff switch precludes the supply of energy to the ignition coil from the battery upon receipt of a first signal from the remote controller. The cutoff switch allows the supply of energy to the ignition coil from the battery upon receipt of a second signal from the remote controller subsequent to receipt of the first signal.

Still yet another object of the present invention is to provide a new vehicle anti-theft system that provides an easy to install means to block the ignition coil from the starting circuit of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new vehicle anti-theft system according to the present invention.

FIG. 2 is a schematic electrical diagram of the present invention.

DESCRIPTION OF THE PREFERRED EMBODIMENT

With reference now to the drawings, and in particular to FIGS. 1 through 2 thereof, a new vehicle anti-theft system embodying the principles and concepts of the present invention will be described.

As best illustrated in FIGS. 1 through 2, the vehicle anti-theft system generally comprises a distributor, an ignition coil electrically connected to the distributor, and a battery electrically connected to the ignition coil to provide electrical energy to the ignition coil. A cutoff switch is electrically connected between the battery and the ignition coil to selectively provide electrical power to the ignition coil. A remote controller has a transmitter for transmitting a signal. The cutoff switch has a receiver for receiving the signal from the remote controller. The cutoff switch precludes the supply of energy to the ignition coil from the battery upon receipt of a first signal from the remote controller. The cutoff switch allows the supply of energy to the ignition coil from the battery upon receipt of a second signal from the remote controller subsequent to receipt of the first signal.

In closer detail, the anti-theft system comprises a vehicle 10 with an engine having a distributor 11, an ignition coil 12 electrically connected to the distributor, and a battery 13 electrically connected to the ignition coil to provide electrical energy to the ignition coil.

A cutoff switch 14 is electrically connected between the battery and the ignition coil to selectively provide electrical power to the ignition coil.

A remote controller 15 is provided having a transmitter 16 for transmitting a signal. The remote controller has an activation switch for selectively transmitting the signal from the remote controller. The activation switch has an actuator 17 for permitting a user to selectively control the activation switch. Preferably, the remote controller has a generally rectangular housing 18 with a length dimension and a width dimension about one-fourth the length dimension. Ideally, the length dimension of the remote controller is about 4 inches and the width dimension of the remote controller is about 1 inch to optimally comfortable fit in a hand of most users.

The cutoff switch has a receiver 19 for receiving the signal from the remote controller. Preferably, the receiver of the cutoff switch has an antenna 20 for enhancing reception of the signal located in an engine compartment of the vehicle.

In use, the cutoff switch precludes the supply of energy to the ignition coil from the battery upon receipt of a first signal from the remote controller. This prevents the engine of the vehicle from starting and thereby prevent the vehicle from being driven. The cutoff switch allows the supply of energy to the ignition coil from the battery upon receipt of a second signal from the remote controller subsequent to receipt of the first signal so that the engine of the vehicle may be started to let a user drive the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An anti-theft system, comprising:

a vehicle having an engine;

said engine having a distributor, an ignition coil electrically connected to said distributor, and a battery electrically connected to said ignition coil to provide electrical energy to said ignition coil;

a cutoff switch electrically connected between said battery and said ignition coil to selectively provide electrical power to said ignition coil;

a remote controller having a transmitter for transmitting a signal, said remote controller having an activation switch for selectively transmitting said signal from said remote controller, said activation switch having an actuator for permitting a user to selectively control said activation switch;

said remote controller having a generally rectangular housing having a length dimension and a width dimension about one-fourth said length dimension;

said cutoff switch having a receiver for receiving said signal from said remote controller, said receiver of said cutoff switch having an antenna in an engine compartment of said vehicle;

said cutoff switch precluding supply of energy to said ignition coil from said battery upon receipt of a first signal from said remote controller such that said vehicle is precluded from being started when said first signal is transmitted from said remote control; and said cutoff switch allowing supply of energy to said ignition coil from said battery upon receipt of a second signal from said remote controller subsequent to receipt of said first signal.

* * * * *